United States Patent Office 2,927,111
Patented Mar. 1, 1960

2,927,111

TROPYL HYDRAZINES

John H. Biel, Milwaukee, Wis., assignor to Lakeside Laboratories, Inc., Milwaukee, Wis., a corporation of Wisconsin No Drawing. Application February 14, 1958
Serial No. 715,191

14 Claims. (Cl. 260—247.5)

This invention relates to hydrazines. More particularly, this invention is concerned with novel 3-nortropyl hydrazine derivatives and processes of producing such compounds. It is also concerned with uses of these novel hydrazine compounds.

According to the present invention there are provided novel 3-nortropyl hydrazines of the formula

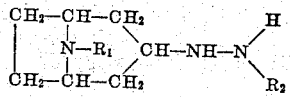

Formula I where $R_1$ represents hydrogen, lower-alkyl groups such as methyl, ethyl, propyl and butyl, and aralkyl groups such as the benzyl, phenylethyl, phenylpropyl and phenylisobutyl, and $R_2$ represents hydrogen, lower alkyl groups such as methyl, ethyl, propyl and butyl, aralkyl groups including the benzyl, phenylethyl and phenylpropyl groups, aryl groups and particularly the phenyl group, an 8-lower alkyl nortropyl group such as the 3-tropyl group, alkene groups such as the allyl group, alkyne groups such as the propargyl group, cycloalkyl groups such as the cyclohexyl and cyclopentyl groups, and groups in which $R_2$ represents secondary amino-lower alkyl groups of the formula

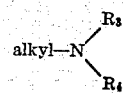

wherein $R_3$ and $R_4$ represent hydrogen, lower alkyl groups such as methyl, ethyl, propyl and butyl, the phenyl group, phenyl-lower alkyl groups such as benzyl, phenylethyl and phenylpropyl, cycloalkyl groups including cyclohexyl and cyclopentyl, lower alkene groups such as the allyl group, lower alkyne groups such as the propargyl group, and groups in which

represents a cyclic amino group including pyrrolidino, morpholin, 4-lower alkyl piperazino, piperidino, 1,2,3,4-tetrahydroisoquinolino, 1,2,3,4-tetra hydroquinolino, isoindolino, indolino, theophyllino and phenothiazino groups, as well as acid addition salts and quaternary ammonium salts of the novel 3-nortropyl hydrazines.

One method of preparing these novel 3-nortropyl hydrazines comprises reacting an appropriate 3-nortropinone with hydrazine or a monsubstituted hydrazine to form an intermediate 3-nortropyl hydrazone which is reduced to the desired 3-nortropyl hydrazine. This reaction may be illustrated as follows:

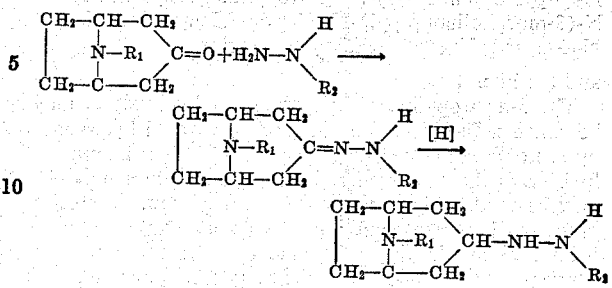

wherein $R_1$ and $R_2$ have the significance previously assigned.

In addition to 3-nortropinone, derivatives thereof having substituents at the N or 8-position such as 8-tropinone, 8-ethylnortropinone, 8-propylnortropinone, 8-benzylnortropinone, 8-phenylethylnortropinone and 8-phenylpropylnortropinone may be used in this process.

Besides hydrazine, monosubstituted hydrazines may be used as reactants in the process. Some monosubstituted hydrazines which may be employed are methylhydrazine, ethylhydrazine, phenylhydrazine, benzylhydrazine, phenylethylhydrazine, cychlopentylhydrazine, cyclohexylhydrazine, allylhydrazine, propargylhydrazine, and secondary amino-lower alkyl hydrazines including 4-methylpiperazinopropyl hydrazine, pyrrolidinobutyl hydrazine, morpholinopropyl hydrazine, 3-tropyl hydrazine and other such compounds as disclosed in my copending application Serial No. 679,520, filed August 21, 1957, now abandoned.

Reaction between the hydrazine and 3-nortropinone, generally as an acid addition salt, may be conveniently effected by bringing the reactants together in a suitable liquid reaction medium, advisably a liquid in which the reactants are soluble and which is unreactive to the hydrazine and 3-nortropinone. Solvents such as lower alcohols and aqueous-lower alcohols are particularly good inexpensive reaction media. While the reaction proceeds at room temperature, it is desirable to raise the temperature of the mixture, such as from 50° C. to the reflux temperature of the reaction mixture. Following reaction the desired hydrazone formed may be recovered from the reaction mixture by conventional methods. Thus, the reaction mixture may be distilled to remove the solvent, the residue taken up with water, alkali added and the compound extracted with an immiscible solvent. Evaporation to dryness yields the compound in pure form; however, it may also be recovered by fractional distillation.

Some of the novel 3-nortropylidenyl hydrazines which are produced by this process are 3-tropylidenyl hydrazine,
3-(8-ethyl nortropylidenyl)hydrazine,
3-(8-benzyl nortropylidenyl)hydrazine,
3-(8-propyl nortropylidenyl)hydrazine,
N-methyl-N'-3-tropylidenyl hydrazine,
N-phenyl-N'-[3-(8-ethyl nortropylidenyl)]hydrazine,
N-benzyl-N'-[3-(8-benzyl nortropylidenyl)]hydrazine,
N-allyl-N'-[3-(tropylidenyl)]hydrazine,
N-cyclohexyl-N'-[3 - (8 - propyl nortropylidenyl)]hydrazine, N-(dimethylaminoethyl) - N' - [3 - (tropylidenyl)]hydrazine,
N - (piperidinopropyl) - N'-[3-(8-ethyl nortropylidenyl)]-hydrazine,
N-(dicyclohexylaminoethyl)-N'-[3-(8-benzyl nortropylidenyl)]hydrazine,
N - (morpholinoethyl)-N'-[3-(8-ethyl nortropylidenyl)]hydrazine,
N-(pyrrolidinomethyl)-N'-(3-tropylidenyl)hydrazine,
N-(diphenylaminoethyl)-N'-(3-tropylidenyl)hydrazine,
N-(4-methylpiperazinopropyl)-N'-(3-tropylidenyl)hydrazine,
N-(4-pyrrolidinobutyl)-N'-(3-tropylidenyl)hydrazine,
N-(3-morpholinopropyl)-N'-(3-tropylidenyl)hydrazine,
N-(3-tropyl)-N'-(3-tropylidenyl)hydrazine, and the like.

The 3-nortropylidenyl hydrazines, or hydrazones, may be converted to the corresponding 3-nortropyl hydrazines by use of a suitable reducing agent. Lithium aluminum hydride is the preferred reducing agent although others may be used, such as catalytic hydrogenation. Catalytic processes, however, sometimes cleave the hydrazine bond. With lithium aluminum hydride the reduction may be conveniently effected by intimately combining the reactants in an inert organic solvent such as anhydrous ether, dioxane and tetrahydrofuran. Elevated temperatures such as the reflux temperature enhance the reaction. At reflux temperature from 1 to 8 hours is usually sufficient to substantially complete the reaction. After the reaction is terminated water may be added to the mixture to decompose excess lithium aluminum hydride. To recover the product the organic phase is separated and the aqueous residue extracted with the same solvent. The organic phase and extracts then may be combined, dried, and the product separated by fractional distillation.

Hydrazines, such as those from the hydrazones named above, may be formed in this way.

An alternative procedure for preparing N'-substituted-3-nortropyl hydrazines comprises reacting a 3-nortropyl hydrazine with an N,N-disubstituted aminoalkyl aldehyde, or acetal thereof, to produce an intermediate N-(3-nortropyl)-N'-disubstituted aminoalkylidenyl hydrazine and reducing the said hydrazone to the corresponding hydrazine. This process may be represented as follows:

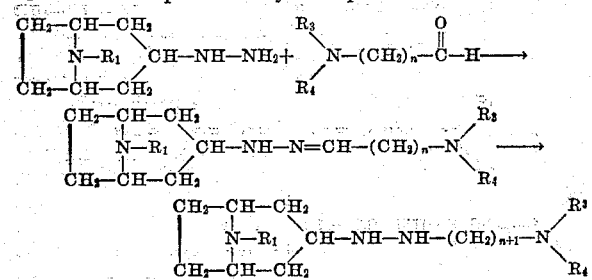

wherein $R_1$, $R_3$ and $R_4$ have the significance previously assigned, and $n$ is an integer from 1 to 10.

In addition to 3-tropyl hydrazine, other compounds which may be used as reactants in this process are 3-(8-ethyl)nortropyl hydrazine,
3-(8-propyl)nortropyl hydrazine,
3-(8-benzyl)nortropyl hydrazine,
3-(8-phenylethyl)nortropyl hydrazine and
3-(8-phenylpropyl)nortropyl hydrazine.

Examples of the N,N-disubstituted aminoalkyl aldehydes and acetals thereof which may be used in the process are dimethylaminoacetaldehyde,
diethylamino-acetaldehyde,
pyrrolidino-acetaldehyde,
morpholino-acetaldehyde,
1,2,3,4-tetrahydroisoquinolino-acetaldehyde,
isoindolino-acetaldehyde,
3-hydroxypiperidino-acetaldehyde,
3-phenoxypiperidino-acetaldehyde,
diphenylamino propionaldehyde,
dibenzylamino-butyraldehyde,
5-(N-phenyl-N-ethylamino)-valeraldehyde,
8-morpholino-caprylaldehyde,
dimethylaminoacetal,
diethylaminoacetal,
3-dimethylamino-propionaldehyde,
pyrrolidinoacetal,
1-methyl-4-piperazinoacetal,
N-propargyl ethylaminopropionaldehyde,
diallylamino acetaldehyde,
dicyclopentylamino-butyraldehyde,
dicyclohexylaminopropionaldehyde,
dibenzylamino-acetaldehyde,
3-indolyl-acetaldehyde and the like.

Reaction between the N,N-disubstituted aminoalkyl aldehyde and 3-nortropyl hydrazine is conveniently effected by contacting the reactants, preferably equimolar quantities thereof, in the presence of water. The reaction proceeds at room temperature although slightly elevated temperatures may be employed to increase the rate of reaction. At room temperature, about 5 to 20 hours is adequate to substantially complete the reaction. Recovery of the intermediate aminoalkylidenyl hydrazine is conveniently achieved by conventional methods. Thus, the product, generally an oil as the free base, may be salted out with an alkali metal hydroxide and extracted with a water immiscible organic solvent such as ether. The product is readily isolated by distillation under reduced pressure.

The N,N-disubstituted aminoalkyl aldehydes may be employed in the reaction as the free aldehydes or as the corresponding acetals. Acetals are preferably employed when the free aldehydes are not of significant stability. To achieve reaction when an acetal is used, a strong acid should be present in the reaction mixture to hydrolyze the acetal to the aldehyde in situ; the excess may be neutralized prior to reacting the hydrazine with the aldehyde.

Representative of the N-(3-nortropyl)-N'-disubstituted aminoalkylidenyl hydrazines which are produced in this way are N-(3-tropyl)-N'-(2-dimethylaminoethylidenyl)hydrazine,
N-(3-tropyl)-N'-(2-diethylaminoethylidenyl)hydrazine,
N-(3-tropyl)-N'-(2-pyrrolidinoethylidenyl)hydrazine,
N-(3-tropyl)-N'-(2-piperidinoethylidenyl)hydrazine,
N-(3-tropyl)-N'-(2-morpholinoethylidenyl)hydrazine,
N-[3-(8-ethylnortropyl)]-N' - (3 - dimethylaminopropylidenyl)hydrazine,
N-[3-(8-benzylnortropyl)]-N'-(4 - dicyclohexylaminobutylidenyl)hydrazine and other similar compounds including those named above as products which could also be produced by the first process.

These N-(3-nortropyl)-N'-disubstituted aminoalkylidenyl hydrazines, or hydrazones, may be reduced to the corresponding hydrazines by chemical or catalytic procedures as described above with regard to the first process.

Acid addition salts and quaternary ammonium salts of the hydrazones and hydrazines are also provided. By reacting a hydrazone or hydrazine with a mineral or organic acid an acid addition salt is produced. Acids such as hydrochloric, sulfuric, formic, acetic, citric, maleic, fumaric and phosphoric may be used to form salts.

Quaternary ammonium salts are readily produced by combining a hydrazine or hydrazone with a suitable alkylating agent such as an alkyl or aralkyl ester of an acid and particularly dimethyl sulfate, methyl chloride, ethyl bromide, methyl iodide, o-chlorobenzyl bromide, phenylethyl chloride, phenylpropyl bromide, benzyl chloride, propargyl chloride and equivalents thereof.

Both the acid addition salts and quaternary ammonium salts form at room temperature although slightly elevated temperatures may be used to increase the reaction. The salts precipitate readily from most organic solvents; some selection of solvent may be necessary, however, but this is within the skill of the art.

The acid addition salts of the novel hydrazines are useful as monoamine oxidase inhibitors. The hydrazine acid addition salts thus block or retard the metabolism of serotonin and norepinephrine in the brain of animals and humans. The serotonin and norepinephrine are thus available in larger amounts; this results in increased sympathetic characteristics, such as increased awareness and motility of mentally depressed patients. These novel hydrazines also stimulate the heart muscle and are thus useful for the treatment of persons in a state of shock.

The quaternary ammonium salts of those compounds of Formula I wherein $R_2$ is an N,N-disubstituted aminoalkyl group exhibit hypotensive properties in animals.

The free hydrazones and hydrazines are also useful in the isolation and purification of penicillin with which they form salts.

The following examples are presented to illustrate, but not limit, the invention.

EXAMPLE 1

3-tropylidenyl hydrazine

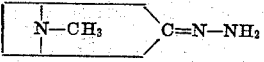

To 103 g. (1.75 mole) of 85% hydrazine hydrate in 400 cc. of refluxing methanol was added—over a period of 12 hours—77 g. (0.35 mole) of tropinone hydrobromide in 350 cc. of methanol. The reaction mixture was refluxed for another two hours, the methanol removed by distillation and the residue taken up in water. The aqueous mixture was treated with alkali and extracted repeatedly with tetrahydrofuran. The combined tetrahydrofuran extracts were dried with potassium carbonate and the product collected by distillation, B.P. 96° C. (0.03 mm.); yield 33 g. (62%), $N_D^{20}$ 1.543.

Analysis.—Calcd. for $C_8H_{15}N_3$: N, 9.14. Found: N, 9.03.

EXAMPLE 2

3-tropyl hydrazine

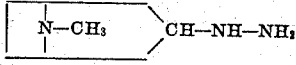

To 8.0 g. (0.21 mole) of lithium aluminum hydride and 250 cc. of tetrahydrofuran was added 35.2 g. (0.23 mole) of 3-tropylidenyl hydrazine in 150 cc. of tetrahydrofuran. The mixture was stirred and refluxed for 4.5 hours and the complex decomposed by the addition of 40% aqueous potassium hydroxide. The water layer was separated and the organic phase dried with potassium carbonate. The product was collected at 87° C. (0.04 mm.); yield 29.3 g. (82%); $N_D^{20}$ 1.539.

Analysis.—Calcd. for $C_8H_{17}N_3$: N (Jamieson method), 18.28. Found: N, 18.53.

The hydrochloride salt melted at 245–246° C.

EXAMPLE 3

N-(2-dimethylaminoethyl)-N'-3-tropyl hydrazine

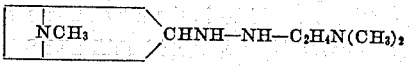

To 100 g. of a conc. hydrochloric acid solution was added, with stirring and cooling, 0.20 mole of dimethylaminoacetal. The solution was concentrated to dryness in vacuo and the residue dissolved in 100 cc. of water. A 20% sodium hydroxide solution was added to 105 cc. of the aqueous dimethylamino acetaldehyde solution until pH 7. To this neutral solution was then added 23 g. (0.15 mole) of 3-tropyl hydrazine in 125 cc. of water. The reaction mixture was allowed to stand at room temperature overnight and then made strongly alkaline with potassium hydroxide. The alkaline mixture was extracted with chloroform, the extracts dried with potassium carbonate and the chloroform removed by distillation in vacuo. The residue containing the intermediate hydrazone was dissolved in 100 cc. of tetrahydrofuran and added to 4.8 g. of lithium aluminum hydride in 200 cc. of tetrahydrofuran. The reaction mixture was stirred and refluxed for 4.5 hours, the complex decomposed with 40% potassium hydroxide solution, the organic phase separated and dried with potassium carbonate. The product was collected at 105° C. (0.04 mm.); yield 14.4 g. (40%); $N_D^{20}$ 1.510.

Analysis.—Calcd. for $C_{12}H_{36}N_4$: N (by titration): 17.76. Found: N, 17.89.

EXAMPLE 4

N-(2-dimethylaminoethyl)-N'-3-tropylhydrazine dimethiodide

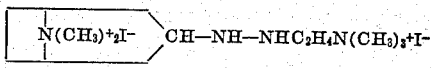

The dimethiodide salt was prepared by adding 4.72 g. of the base described in Example 3 to 8.5 g. of methyl-iodide in 35 cc. of methanol. The precipitate was collected by filtration and recrystallized from methanol, yield 9.7 g.; M.P. 223–224° C. (dec.).

Analysis.—Calcd. for $C_{14}H_{22}I_2N_4$: N, 5.49; I, 49.74. Found: N, 5.41; I, 49.42.

EXAMPLE 5

N-(2-diethylaminoethyl)-N'-3-tropyl hydrazine

This compound was prepared by the procedure described in Example 3. From 30.3 g. (0.16 mole) of diethylaminoacetal and 24.9 g. (0.16 mole) of 3-tropyl hydrazine there was obtained 22.1 g. (60%) of the desired hydrazine, B.P. 125–132° C. (0.04 mm.); $N_D^{20}$ 1.5099.

Analysis.—Calcd. for $C_{14}H_{30}N_4$: N (by titration), 16.52. Found: N, 15.60.

The dimethiodide salt was prepared in ethanol and melted at 206–207° C. (dec.).

Analysis.—Calcd. for $C_{16}H_{36}I_2N_4$: N (by titration), 5.20; I, 47.16. Found: N (by titration), 5.21; I, 46.43.

EXAMPLE 6

N-(2-pyrrolidinoethyl)-N'-3-tropyl hydrazine

This compound was prepared by the procedure described in Example 3. From 30 g. (0.16 mole) of pyrrolidinoacetal and 24.9 g. (0.16 mole) of 3-tropyl hydrazine there was obtained 19.6 g. (56%) of product, B.P. 135–139° C. (0.04 mm.); $N_D^{20}$ 1.5229.

Analysis.—Calcd. for $C_{14}H_{28}N_4$: N, 17.48. Found: N (by titration), 15.20.

The dimethiodide salt melted at 205° C. (dec.).

Analysis.—Calcd. for $C_{16}H_{34}I_2N_4$: I, 47.33; N, 5.22. Found: I, 47.29; N, 5.17.

EXAMPLE 7

N-(2-morpholinoethyl)-N'-3-tropyl hydrazine

This compound was prepared in 70% yield by the procedure in Example 3 by reacting morpholinoacetal with 3-tropyl hydrazine; B.P. 145° C. (0.03 mm.); $N_D^{20}$ 1.5247.

Analysis.—Calcd. for $C_{14}H_{28}N_4O$: N (by titration), 10.43. Found: N (by titration), 10.24.

The dimethiodide salt was prepared in ethanol, M.P. 207–208° C.

EXAMPLE 8

N-[3-(4'-methylpiperazino)-propyl]-N'-3-tropyl hydrazine

To 29.9 g. (0.21 mole) of tropinone in 200 cc. of water was added with stirring and cooling 36.2 g. (0.21 mole) of 3-(4-methylpiperazino)-propyl hydrazine in 60 cc. of water. The mixture was allowed to stand overnight. The aqueous mixture was made strongly alkaline with solid potassium hydroxide and extracted with ether. The combined ether extracts were dried with potassium carbonate. The solvent was removed by distillation and the residue (60.7 g.) subjected to reduction in anhydrous tetrahydrofuran with 7.9 g. (0.206 mole) of lithium aluminum hydride by the procedure of Example 3. The product was collected by distillation at 172–174° C. (0.08 mm.); yield 28.4 g. (46%); $N_D^{20}$ 1.5227.

*Analysis.*—Calcd. for $C_{16}H_{33}N_5$: N (by titration), 9.48. Found: N (by titration), 9.45.

EXAMPLE 9

N-(2-dimethylaminoethyl)-N'-3-tropyl hydrazine

This compound was also prepared by the procedure described in Example 8 from tropinone and dimethylaminoethyl hydrazine; B.P. 105–107° C. (0.03 mm.); yield 41%; $N_D^{20}$ 1.5098.

*Analysis.*—Calcd. for $C_{12}H_{26}N_4$: N (by titration) 17.78. Found: N, 17.27.

The dimethiodide salt was prepared, M.P. 220–221° C. A mixed melting point with the dimethiodide of Example 4 showed no depression. Both procedures have yielded the identical end product.

EXAMPLE 10

N,N'-bis-(3-tropylidenyl)-hydrazine

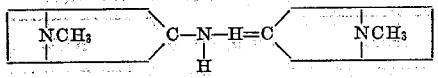

This compound was prepared from tropinone and 3-tropyl hydrazine; B.P. 157° C. (0.06 mm.).

*Analysis.*—Calcd. for $C_{16}H_{26}N_4$: N (titratable), 10.21. Found: N (titratable), 9.94.

EXAMPLE 11

N,N'-bis-(3-tropyl)-hydrazine

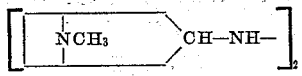

This compound was prepared by the reduction of the hydrazone of Example 10 with lithium aluminum hydride in tetrahydrofuran, yield 71%; B.P. 154° C. (0.03 mm.); $N_D^{20}$ 1.5470.

*Analysis.*—Calcd. for $C_{16}H_{30}N_4$: N (titratable), 10.06. Found: N, 10.02.

Various changes and modifications of the invention can be made and, to the extent that such variations incorporate the spirit of this invention, they are intended to be included within the scope of the appended claims.

What is claimed is:

1. N-(2-dimethylaminoethyl)-N'-3-tropyl hydrazine.
2. N-(2-diethylaminoethyl)-N'-3-tropyl hydrazine.
3. N-(2-pyrrolidinoethyl)-N'-3-tropyl hydrazine.
4. N-(2-morpholinoethyl)-N'-3-tropyl hydrazine.
5. N-[3-(4'-methylpiperazino)-propyl]-N'-3-tropyl hydrazine.
6. N,N'-bis-(3-tropylidenyl)-hydrazine.
7. N,N'-bis-(3-tropyl)-hydrazine.
8. N-(di-lower alkylamino-lower alkyl)-N'-[3-(8-lower alkyl)nortropyl]hydrazine.
9. N-(di-lower alkylamino-lower alkyl)-N'-3-nortropyl hydrazine.
10. N-(morpholino-lower alkyl)-N'-[3-(8-lower alkyl)nortropyl]hydrazine.
11. N-[pyrrolidino-lower alkyl)-N'-[3-(8-lower alkyl)-nortropyl]hydrazine.
12. N,N'-bis-(8-lower alkyl nortropyl)-hydrazine.
13. A member of the group consisting of compounds of the formulae

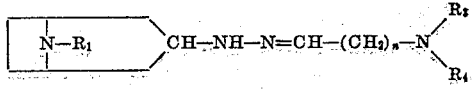

and

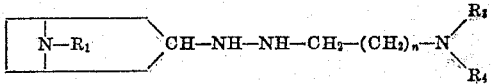

and nontoxic acid addition salts, nontoxic lower alkyl quaternary ammonium salts and nontoxic phenyl-lower alkyl quaternary ammonium salts thereof, wherein $R_1$ is a member of the group consisting of hydrogen, lower alkyl, and phenyl-lower alkyl, $R_3$ and $R_4$ are members of the group consisting of hydrogen, lower alkyl, phenyl, phenyl-lower alkyl, cyclohexyl, cyclopentyl lower alkenyl, lower alkynyl and compounds in which

represents a member of the group consisting of pyrrolidino, morpholino, 4-lower alkyl piperazino, piperidino, 1,2,3,4 - tetrahydroisoquinolino, 1,2,3,4 - tetrahydroquinolino, isoindolino, indolino, theophyllino and phenothiazino and n is an integer from 1 to 10.

14. The process which comprises reacting a compound of the formula

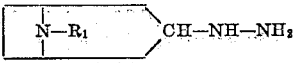

with a compound of the formula

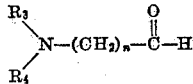

to produce a compound of the formula

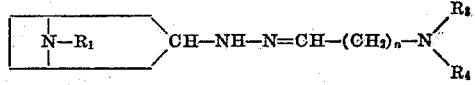

and reducing this hydrazone to the corresponding hydrazine of the formula

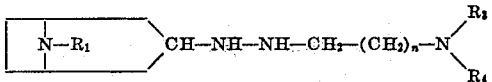

wherein $R_1$ is a member of the group consisting of hydrogen, lower alkyl, and phenyl-lower alkyl, $R_3$ and $R_4$ are members of the group consisting of hydrogen, lower alkyl, phenyl, phenyl-lower alkyl, cyclohexy, cyclopentyl, lower alkenyl, lower alkynyl and compounds in which

represents a member of the group consisting of pyrrolidino, morpholino, 4-lower alkyl piperazino, piperidino, 1,2,3,4 - tetrahydroisoquinolino, 1,2,3,4 - tetrahydroquinolino, isoindolino, indolino, theophyllino, and phenothiazino and n is an integer from 1 to 10.

References Cited in the file of this patent

UNITED STATES PATENTS

| | | |
|---|---|---|
| 2,752,347 | Bortnick et al. | June 26, 1956 |
| 2,804,460 | Cavallito et al. | Aug. 27, 1957 |
| 2,838,914 | Bernstein et al. | June 17, 1958 |

UNITED STATES PATENT OFFICE

CERTIFICATE OF CORRECTION

Patent No. 2,927,111                  March 1, 1960

John H. Biel

It is hereby certified that error appears in the printed specification of the above numbered patent requiring correction and that the said Letters Patent should read as corrected below.

Column 7, lines 40 to 42, the center portion of the formula should appear as shown below instead of as in the patent:

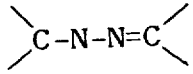

column 8, line 58, for "cyclohexy" read -- cyclohexyl --.

Signed and sealed this 27th day of December 1960.

(SEAL)
Attest:

KARL H. AXLINE
Attesting Officer

ROBERT C. WATSON
Commissioner of Patents